Patented Apr. 19, 1949

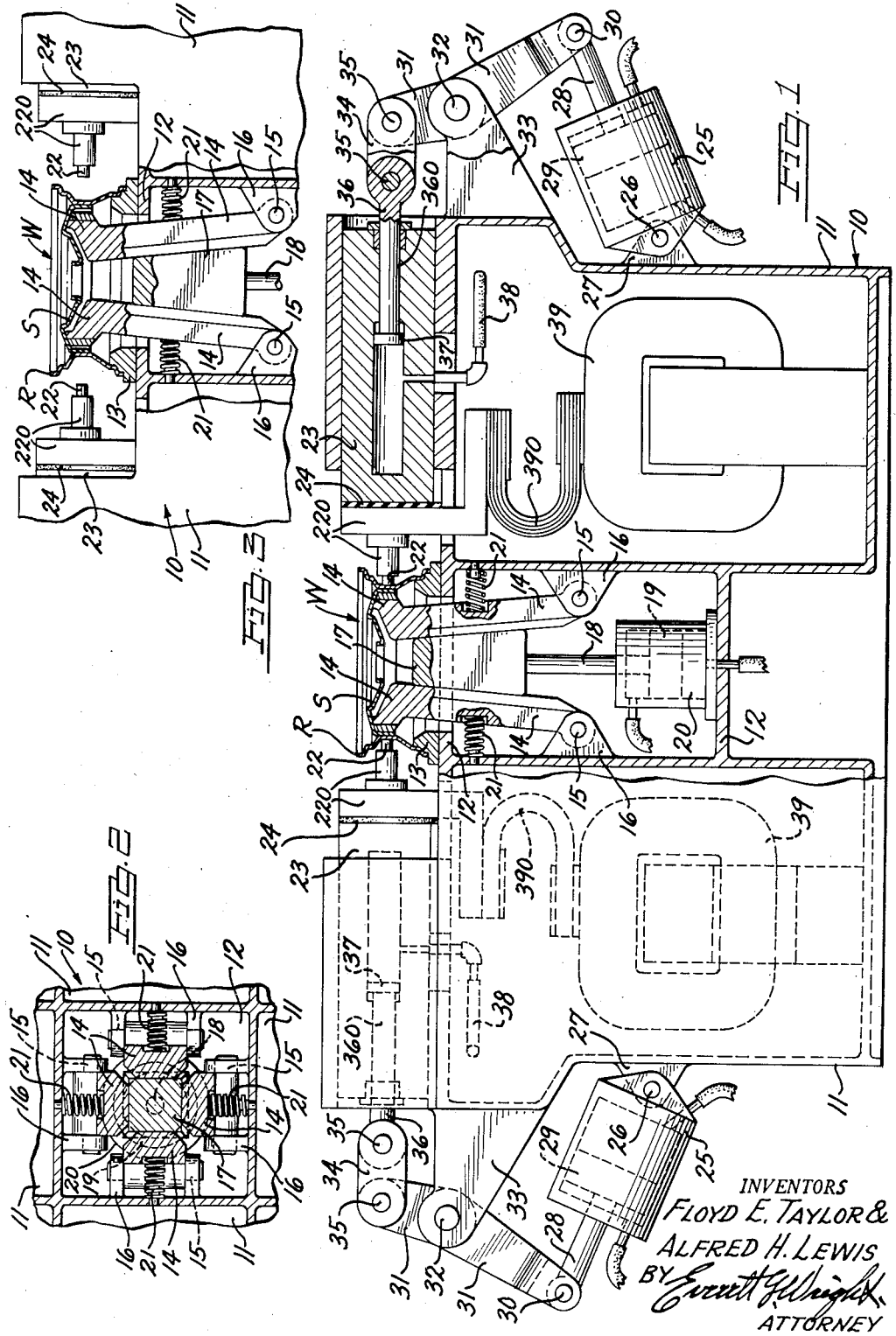

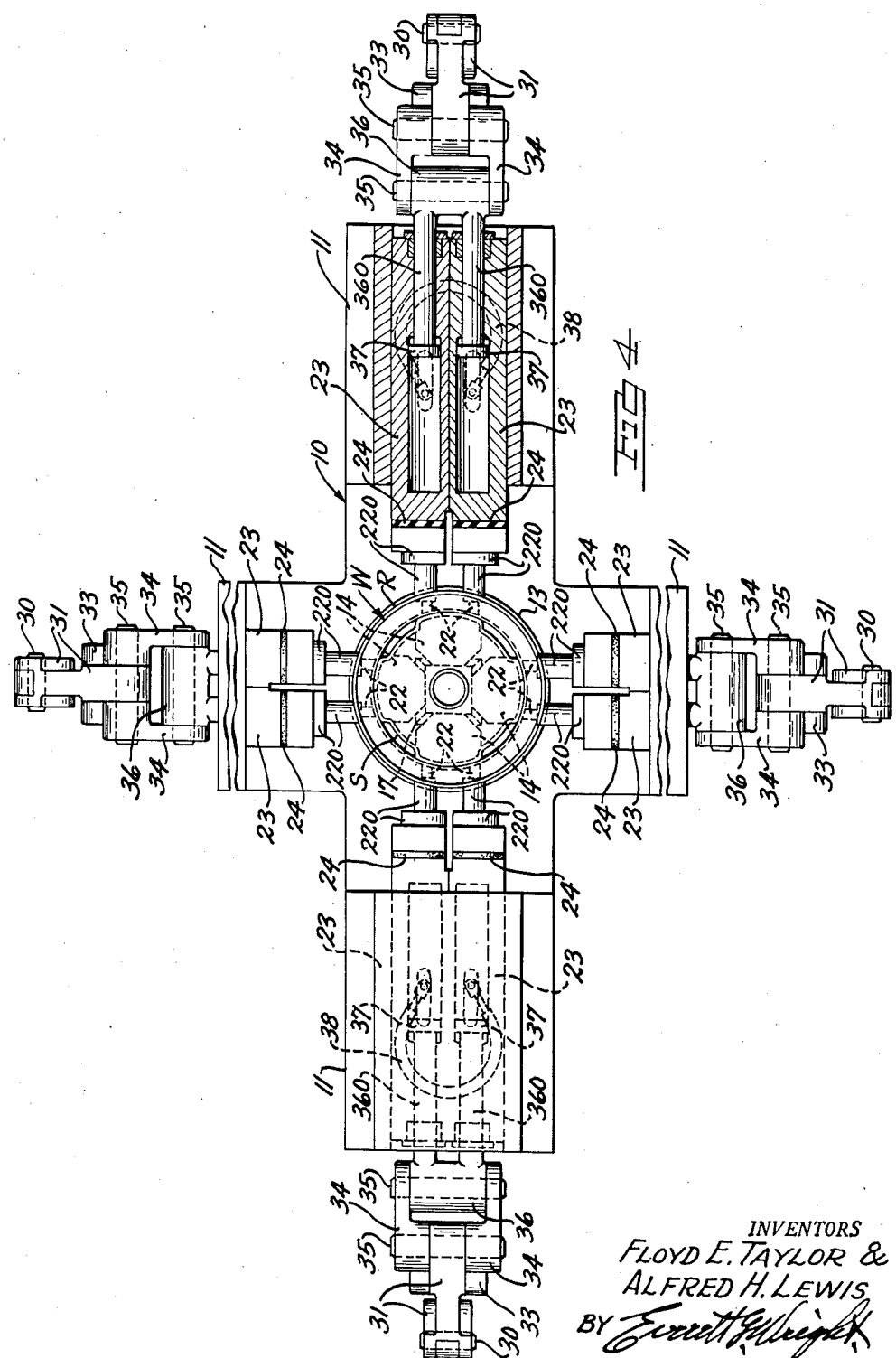

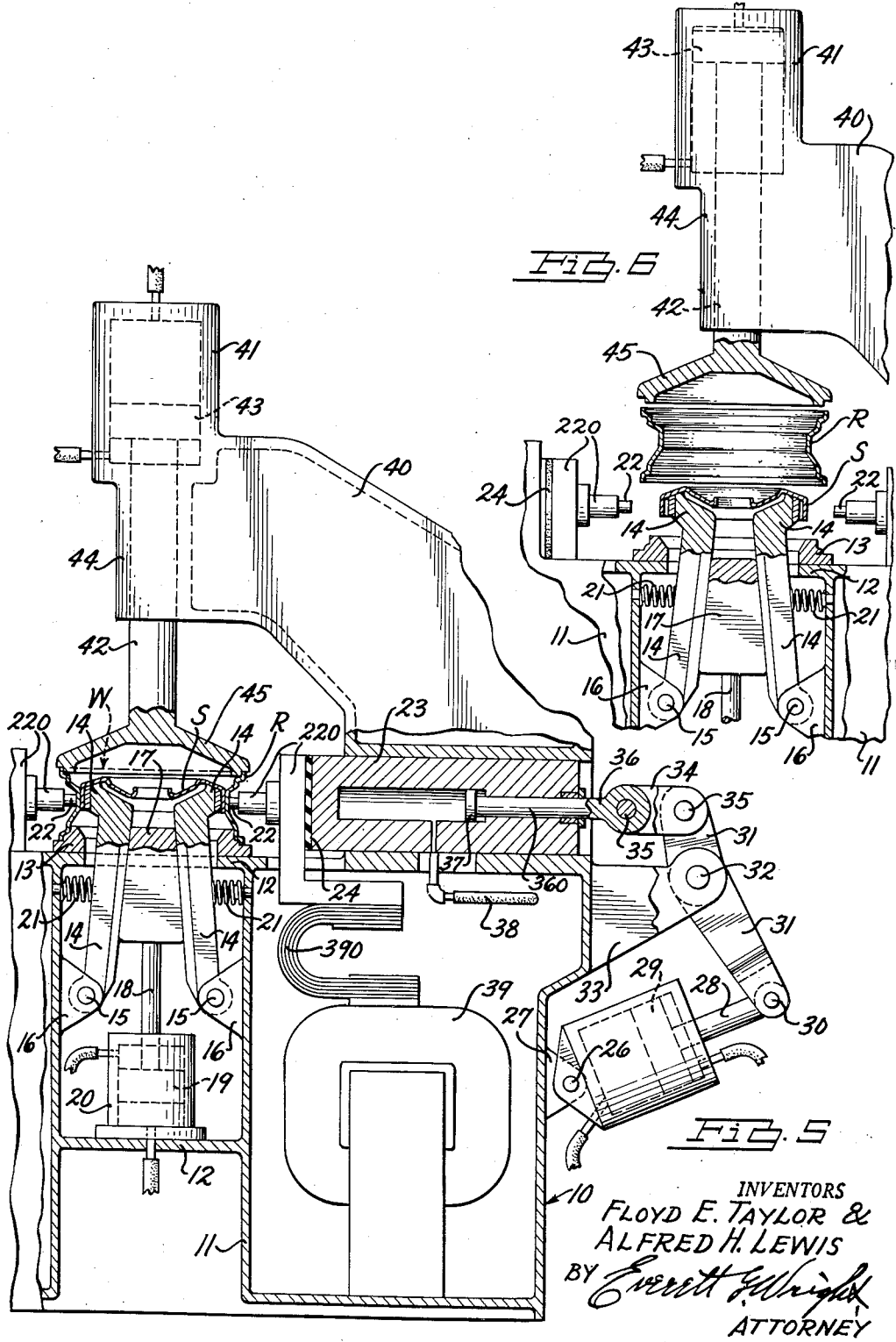

2,468,001

UNITED STATES PATENT OFFICE 2,468,001

MEANS FOR MANUFACTURING AUTOMOBILE WHEELS

Floyd E. Taylor, Bloomfield Hills, and Alfred H. Lewis, Huntington Woods, Mich., assignors to Swift Electric Welder Company, a corporation of Michigan Application February 9, 1948, Serial No. 7,228

6 Claims. (Cl. 219—4)

This invention relates to improvements in the method and means for manufacturing automobile wheels and in particular to the assembly and welding of the rims of automobile wheels to the spiders thereof.

The modern automobile wheel usually comprises a rim and a spider, each of which is formed ready for assembly on suitable metal working machines. Generally, the spider is pressed into the rim and the rim is secured thereto by means of riveting. This riveting has proven both costly and unsatisfactory because, in order to obtain a high rate of production, cold rivets are employed which ofttimes do not completely fill the holes through which they are inserted after driving and which rust easily due to imperfect heading and clinching. Imperfectly manufactured automobile wheels develop wobbles which become progressively worse as the automobile is used which result in rim squeaks and unbalanced wheels and tires.

With the foregoing in view, it is the primary object of this invention to provide an improved method and machine for welding automobile wheels wherein multiple welding of automobile rims to spiders is accomplished with assurance of uniformly perfect welds without distortion of the finished wheel.

A further object of the invention is to provide an improved and effective welding machine for welding pre-formed spiders and rims of automobile wheels in assembled relationship wherein uniformity of welds are assured by employing hydraulically balanced electrodes at each segment of the wheel spider onto which the rim is supported simultaneous with applying opposite to the electrodes equalized mandrel pressure at each segment of the wheel spider during welding.

A further object of the invention is to provide an improved method and machine for the manufacture of automobile wheels wherein pre-formed rims are assembled onto pre-formed spiders and then welded into assembled relationship in a manner to assure the welding being accomplished under conditions of uniform electrode and mandrel pressure whereby to provide wheels of greater strength, uniform accuracy and more perfect rim alignment.

Other objects of the invention will become apparent by reference to the following detailed description taken in connection with the accompanying drawings, in which:

Fig. 1 is a side elevational view of a wheel welder embodying the invention showing a pre-formed and pre-assembled wheel spider and wheel rim being welded into a completed wheel.

Fig. 2 is a fragmentary horizontal sectional view taken on the line 2—2 of Fig. 1.

Fig. 3 is a fragmentary vertical sectional view showing the mandrel and electrodes of the wheel welding machine disclosed in Figs. 1 and 2 in their retracted positions wherein wheels to be welded and welded wheels may be loaded in and unloaded from the wheel welder.

Fig. 4 is a combined top plan and horizontal sectional view of the wheel welder disclosed in Figs. 1-3, inclusive, taken on the line 4—4 of Fig. 1.

Fig. 5 is a fragmentary view part in elevation and part in longitudinal section of an alternate embodiment of the invention wherein the wheel welding machine includes a pressure head for pressing the rim onto the spider and holding the spider and rim in both radial and axial alignment during welding.

Fig. 6 is a fragmentary vertical sectional view showing the pressure head, mandrel and electrodes of the wheel assembling and welding machine disclosed in Fig. 5 in their retracted positions with a spider placed in the mandrel and a rim disposed over the spider ready to be set onto the said spider preparatory to pressing the said wheel rim thereonto.

Referring now to the drawing wherein like numerals refer to like and corresponding parts throughout the several views, the illustrative embodiment of the invention disclosed in Figs. 1-4, inclusive, comprises a base 10 composed of a plurality of pedestals 11 surrounding a center section 12 which may be formed integral with the pedestals 11 as indicated in the drawings or bolted or otherwise rigidly secured thereto. On the top of the said center 12 is disposed a jig 13 which receives and centers a wheel W composed of a rim R which has an axially flanged spider S pressed therein. The assembly of the rim R and spider S into the wheel W is accomplished on hydraulic presses using suitable dies, which equipment is not a part of the embodiment of the invention disclosed in Figs. 1-4, inclusive.

The central portion of the top of the center section 12 and the jig 13 are suitably apertured to accommodate mandrel arms 14 faced with a material of higher electrical conductivity than the rim R and the spider S of the wheel W, which mandrel arms 14 are pivoted to the pedestals 11 on suitable pivots 15 preferably supported on bifurcated brackets 16 on the inner wall of the pedestals 11 as shown in Figs. 1 and 2. The tops of the mandrel arms 14 are shaped to conform to the flanges of the spider S of the wheel W. Each of the mandrel arms 14 are formed along the side thereof nearest the center of the machine to serve as cam followers which are engaged by a tapered reciprocating cam 17 mounted on the upper end of a ram 18 connected to the piston 19 of a hydraulic cylinder 20 preferably supported on the bottom of the said center section 12 of the base 10. When the hydraulic cylinder 20 retracts the tapered cam 17 to the position indicated in Fig. 3, compression springs 21 reacting against the pedestals 11 of the base 10 move the said mandrel arms 14 inwardly toward the center of the machine whereby to permit the spider S of the wheel W to be positioned thereon or removed therefrom.

On each of the pedestals 11 of the base 10 a pair of electrodes 22 are reciprocatingly mounted in lateral spaced relationship to each other on electrode carriers 220 fixed to a pair of slides 23 which are insulated from the said slides 23 by suitable insulation 24. In the particular embodiment of the invention shown in Figs. 1-4 inclusive, the said slides 23 are shown parallel to each other and the points of the electrodes 22 are so shaped as to accomplish the desired welding of the rim R of the axially disposed flanges of the spider S of the wheel W. However, it is contemplated that the electrodes 22 may be arranged in pairs with their angle of attack against the rim R of the wheel W normal thereto. This would necessitate the rearrangement of the slides 23 in pairs in radially disposed relationship to the rim of the wheel W which construction would be obvious to anyone skilled in the art of machine building after reference to the instant disclosure.

Each of the slides 23 is so mounted as to reciprocate toward and away from the mandrel arm 14 opposite thereto independent of the adjacent slide. On the outside of each of the pedestals 11 is mounted a hydraulic cylinder 25 on a pivot 26 disposed through a bifurcated bracket 27. A ram 28 is fixed to the piston 29 of the hydraulic cylinder 25 and extends outwardly therefrom. The ram 28 of the hydraulic cylinder 25 is connected by means of a pivot pin 30 to a suitable bell crank 31 pivoted on a pivot pin 32 disposed through a bifurcated bracket 33 extending rearwardly from the pedestal 11. Linkages 34 and pivot pins 35 connect the said bell crank 31 to a double hydraulic ram 36 reciprocatingly mounted in and extending from each slide 23. Each ram 360 of the double hydraulic ram 36 is provided with a head 37 disposed within the longitudinal cylindrical bore 230 in each slide 23 whereby to permit the action of the hydraulic cylinder 25 to retract the slides 23 as well as advance them. The cylinders 230 of each pair of slides 23 are interconnected by a flexible pressure line 38 and are filled with hydraulic fluid thereby creating a closed hydraulic circuit therebetween. With such construction, uniform electrode pressure is assured at each electrode 22 of each pair of electrodes 22. The expansion of the mandrel arms 14 by the hydraulic cylinder 20 within the spider S of the wheel W forces the outer flanges of spider S against the rim R creating a positive electrical bridge between each electrode 22 of each pair of electrodes 22 through a flange of the spider S and the rim R of the wheel W while welding in two spots at each of the said flanges of the spider S of which four are shown on the particular spider S indicated in Fig. 4.

Welding current is supplied to each pair of electrodes 22 through a welding transformer 39 mounted in each of the pedestals 11 of the housing 12. Each secondary lead 390 from each transformer 39 is formed of a flexible conductor and looped as indicated in Fig. 1, and is connected at its outer end to the bottom of an electrode carrier 220 fixed to a slide 23. Suitable electronic controls which are familiar to those skilled in the welding art are employed to time the weld to begin after the mandrel arms 14 are expanded and the electrodes 22 are applied under equalized pressure and regulate the intensity and duration of welding current which flows through the electrodes, the rim R and the spider S at each welding station of the welder. The uniformity of mandrel pressure and the balanced electrode pressures accomplished by the novel organization and arrangement of the elements of the invention provide means for attaining improved welding accuracy in the welding of wheel rims to spiders which result in not only a saving in manufacturing time and costs over riveting, but also provide a more accurate and stronger finished wheel that will not deteriorate from rust and usage at the points of fixation between the components thereof.

The embodiment of the invention disclosed in Figs. 5 and 6 is like and similar to the embodiment of the invention disclosed in Figs. 1-4, inclusive, except one pedestal 11 of the base 10 is provided with a cantilever arm 10 into the upper end of which is disposed a hydraulic cylinder 41 having a ram 42 depending from the piston 43 thereof. The said ram 42 reciprocates through a guide 44 formed integral with the cantilever arm 40 and disposed axially above the center section 12 of the base 10 onto which the jig 13 is mounted. A circular head 45 is carried by the lower end of the ram 40 and is formed to engage the periphery of the rim R when placed over a spider S positioned on the mandrel arms 14. The downward movement of the ram 42 by the hydraulic cylinder 41 causes the head 45 to press the rim R onto the spider S, thus assembling the components of the wheel W into a pressed fit relationship. This is preferably accomplished when the mandrel arms 14 are slightly retracted and while the electrodes 22 are fully retracted as indicated in Fig. 6.

The electrodes 22 are then advanced by the action of the hydraulic cylinders 25 and the mandrel arms 14 are expanded by the hydraulic cylinder 20 as indicated in Fig. 5 to force the outer flanges of the spider S against the rim R of the wheel W creating a positive electrical bridge between each electrode 22 of each pair of electrodes 22 through a flange of the spider S and the rim R of the wheel W while welding the spider S to the rim R in two spots at each of the flanges of the spider S. Thus, the embodiment of the invention disclosed in Figs. 5 and 6 accomplishes wheel assembly and the welding together of the spider and the rim of a wheel with less expense in handling of the component parts and with superior resulting wheel strength and accuracy than heretofore attainable.

Although but two embodiments of the invention have been disclosed and described in detail, many changes may be made in the method steps and in the size, shape, arrangement and details of the elements of the invention without departing from the spirit and scope of the invention thereof as defined by the appended claims.

We claim:

1. A machine for welding together the components of an automobile wheel of the type composed of a circular rim and a multi-flanged spider pressed within the said rim comprising an expandible mandrel consisting of a plurality of radially expandible arms each including a facing of high conductivity material disposed to contact the flanged spider opposite the rim at the portion to be welded and formed to support the wheel by the spider opposite the flanges thereof, pairs of electrodes disposed at intervals around the circular rim opposite each flange of the wheel spider, an electrode carrier supporting each electrode, a slide onto which each electrode carrier is mounted, and means for advancing and retracting each pair of electrodes including their carriers and slides toward and away from the wheel rim opposite each flange of the said wheel spider, means for expanding the said mandrel whereby to expand the flanges of the said spider into solid contact with the rim opposite each pair of electrodes, and means equalizing the electrode pressure of each pair of electrodes against the said rim opposite each spider flange when the said electrode carrier slides are in their advanced position, and a welding transformer connected to each pair of electrodes adapted to supply welding current thereto when the mandrel arms are expanded and the electrode pressures are equalized whereby to accomplish positive and uniform welding of the wheel rim to the flanges of the wheel spider.

2. A machine for welding together the components of an automobile wheel of the type composed of a circular rim and a flanged spider pressed within the said rim comprising an expandible mandrel consisting of a plurality of radially expandible arms each including a facing of high conductivity material disposed to contact the flanged spider opposite the rim at the portion to be welded and formed to support the wheel by the spider thereof, pairs of electrodes disposed at intervals around the circular rim opposite the wheel spider, an electrode carrier supporting each electrode, a slide onto which each electrode carrier is mounted, and means for advancing and retracting each pair of electrodes including their carriers and slides toward and away from the wheel rim opposite the flange of the said wheel spider, means for expanding the said mandrel whereby to expand the flange of the said spider into solid contact with the rim opposite each pair of electrodes, and means equalizing the electrode pressure of each pair of electrodes against the said rim opposite the spider flange when the said electrode carrier slides are in their advanced position, and a welding transformer connected to each pair of electrodes adapted to supply welding current thereto when the mandrel arms are expanded and the electrode pressures are equalized whereby to accomplish positive and uniform welding of the wheel rim to the flange of the wheel spider.

3. A machine for welding together the components of an automobile wheel of the type composed of a circular rim and a multi-flanged spider comprising an expandible mandrel consisting of a plurality of radially expandible arms each including a facing of high conductivity material disposed to contact the flanged spider opposite the rim at the portion to be welded formed to support the wheel spider opposite the flanges thereof, means for pressing the wheel rim over the said spider into a pressed fit assembly, pairs of electrodes disposed at intervals around the circular rim opposite each flange of the wheel spider, an electrode carrier supporting each electrode, a slide onto which each electrode carrier is mounted, and means for advancing and retracting each pair of electrodes including their carriers and slides toward and away from the wheel rim opposite each flange of the said wheel spider, means for expanding the said mandrel whereby to expand the flanges of the said spider into solid contact with the rim opposite each pair of electrodes, and means equalizing the electrode pressure of each pair of electrodes against the said rim opposite each spider flange when the said electrode carrier slides are in their advanced position, and a welding transformer connected to each pair of electrodes adapted to supply welding current thereto when the mandrel arms are expanded and the electrode pressures are equalized whereby to accomplish positive and uniform welding of the wheel rim to the flanges of the wheel spider.

4. A machine for welding together the components of an automobile wheel of the type composed of a circular rim and a flanged spider comprising an expandible mandrel consisting of a plurality of radially expandible arms each including a facing of high conductivity material disposed to contact the flanged spider opposite the rim at the portion to be welded formed to support the wheel spider thereof, means for pressing the wheel rim over the said spider into a pressed fit assembly, pairs of electrodes disposed at intervals around the circular rim opposite the wheel spider, an electrode carrier supporting each electrode, a slide onto which each electrode carrier is mounted, and means for advancing and retracting each pair of electrodes including their carriers and slides toward and away from the wheel rim opposite the flange of the said wheel spider, means for expanding the said mandrel whereby to expand the flange of the said spider into solid contact with the rim opposite each pair of electrodes, and means equalizing the electrode pressure of each pair of electrodes against the said rim opposite the spider flange when the said electrode carrier slides are in their advanced position, and a welding transformer connected to each pair of electrodes adapted to supply welding current thereto when the mandrel arms are expanded and the electrode pressures are equalized whereby to accomplish the positive and uniform welding of the wheel rim to the flange of the wheel spider.

5. A machine for welding together the components of an automobile wheel of the type composed of a circular rim and a multi-flanged spider comprising a base including a central portion and a plurality of pedestals disposed therearound and fixed thereto, a jig on the top of the said central portion of the base adapted to receive and locate the wheel rim, a mandrel arm including a facing of high conductivity material disposed to contact the flanged spider opposite the rim at the portion to be welded pivoted to each of the said pedestals extending upwardly through the said central portion of the said base, the mandrel arms being formed at the top thereof to engage the spider opposite the flanges thereof and formed at their sides nearest the center of the machine to serve as cam followers, a tapered vertically reciprocating cam disposed in the center of the machine adapted to expand said mandrel arms, hydraulic means for reciprocating the said cam, spring means constantly urging the said mandel arms to follow the said cam, each pedestal including a pair of electrodes disposed opposite a flange of the wheel spider, an electrode carrier supporting each electrode, a slide onto which each electrode carrier is mounted, hydraulic means for advancing and retracting each pair of electrodes including their carriers and slides toward and away from the wheel rim opposite a flange of the wheel spider, and hydraulic means for equalizing the pressure of the electrodes with respect to the said wheel rim, and a welding transformer connected to each pair of electrodes adapted to supply welding current thereto when the said mandrel arms are expanded whereby to accomplish the welding of the wheel rim to the flanges of the wheel spider.

6. A machine for welding together the components of an automobile wheel of the type composed of a circular rim and a multi-flanged spider comprising a base including a central portion and a plurality of pedestals disposed therearound and fixed thereto a jig on the top of the said central portion of the base adapted to receive and locate the wheel rim, a mandrel arm including a facing of high conductivity material disposed to contact the flanged spider opposite the rim at the portion to be welded pivoted to each of the said pedestals extending upwardly through the said central portion of the said base, the mandrel arms being formed at the top thereof to engage the spider opposite the flanges thereof and formed at their sides nearest the center of the machine to serve as cam followers, the several mandrel arms cooperating to support a wheel spider when placed thereon, means for pressing a wheel rim onto the said spider in pressed fit assembly when superimposed thereover, a tapered vertically reciprocating cam disposed in the center of the machine adapted to expand said mandrel arms, hydraulic means for reciprocating the said cam, spring means constantly urging the said mandrel arms to follow the said cam, each pedestal including a pair of electrodes disposed opposite a flange of the wheel spider, an electrode carrier supporting each electrode, a slide onto which each electrode carrier is mounted, hydraulic means for advancing and retracting each pair of electrodes including their carriers and slides toward and away from the wheel rim opposite a flange of the wheel spider, and hydraulic means for equalizing the pressure of the electrodes with respect to the said wheel rim, and a welding transformer connected to each pair of electrodes adapted to supply welding current thereto when the said mandrel arms are expanded whereby to accomplish the welding of the wheel rim to the flanges of the wheel spider.

FLOYD E. TAYLOR.
ALFRED H. LEWIS.

REFERENCES CITED

The following references are of record in the file of this patent:

UNITED STATES PATENTS

| Number | Name | Date |
| --- | --- | --- |
| 1,252,143 | Murray et al. | Jan. 1, 1918 |
| 1,303,906 | Jobski | May 20, 1919 |
| 1,850,454 | Gross | Mar. 22, 1932 |